(12) United States Patent
Hoffman et al.

(10) Patent No.: US 7,960,944 B2
(45) Date of Patent: Jun. 14, 2011

(54) POWER SUPPLY THAT SUPPLIES POWER TO AND COMMUNICATES WITH AN ELECTRICAL APPLIANCE

(75) Inventors: Peter F. Hoffman, Avon, OH (US); Michael J. Brandon, II, North Ridgeville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 936 days.

(21) Appl. No.: 11/850,380

(22) Filed: Sep. 5, 2007

(65) Prior Publication Data

US 2010/0264875 A1 Oct. 21, 2010

(51) Int. Cl.
*H01M 10/46* (2006.01)
(52) U.S. Cl. .................................................. 320/107
(58) Field of Classification Search .................. 320/103, 320/107, 111, 114, 115, 132
See application file for complete search history.

(56) References Cited

U.S. PATENT DOCUMENTS

| | | |
|---|---|---|
| 5,130,634 A | 7/1992 | Kasai |
| 5,734,252 A | 3/1998 | Griffin et al. |
| 6,078,871 A | 6/2000 | Anderson |
| 6,184,652 B1 | 2/2001 | Yang |
| 6,362,610 B1 | 3/2002 | Yang |
| 6,507,172 B2 | 1/2003 | Sherman |
| 7,193,865 B2 | 3/2007 | Balakrishnan et al. |
| 2005/0174094 A1 | 8/2005 | Purdy et al. |
| 2006/0098460 A1 | 5/2006 | Balakrishnan et al. |

FOREIGN PATENT DOCUMENTS

| | | |
|---|---|---|
| EP | 0711015 A | 5/1996 |
| EP | 1146621 A | 10/2001 |
| KR | 10-1999-0077666 A | 10/1999 |

OTHER PUBLICATIONS

Robert Sanders, Eliminating "standby" electricity loss from home appliances could save up to 25 percent on electrical bills, study shows, University of California Berkeley press release, Feb. 9, 2001, 3 sheets, http://www.berkeley.edu/news/media/releases/2001/02/09_energ.html.
Philips Semiconductors, UBS On-The-Go: A Tutorial, White Paper, Jan. 2002, 9 sheets.
Calwell et al., Power Supplies: A Hidden Opportunity for Energy Savings, NRDC Report, May 22, 2002, pp. cover page-22.
Alan Meier, Final Report Research Recommendations to Achieve Energy Savings for Electronic Equipment Operating in Lower Power Modes, Sep. 30, 2002, pp. cover page-10.
Maxim, Dual-Input, USB/AC Adapter, 1-Cell Li+ Charger with OVP and Thermal Regulation, MAX1874, Jul. 2003, pp. 1-16.
Len Sherman, Charge Your Battery Faster by Using a USB Port, Power Electronic Technology, Jan. 2004, pp. 34-40, www.powerelectronics.com.
Dallas Semiconductor, Charging Batteries Using USB Power, Maxim application note 3241, May 25, 2004, 7 pages.
Texas Instruments, Single-Chip Charger and DC/DC Converter IC for Bluetooth Headsets and Other Portable Applications (bq2501x), data sheet, Mar. 2005, 24 sheets.

(Continued)

*Primary Examiner* — Edward Tso
(74) *Attorney, Agent, or Firm* — Michael C. Pophal

(57) ABSTRACT

A system includes a power source (102), a power supply (103), and an electrical appliance (106). The power supply (103) uses power from the power source (102) to supply power to the electrical appliance (106). The devices carry out one or more of operations such as power converter disconnect, load shifting, power supply capability determination, and load prioritization operations.

38 Claims, 11 Drawing Sheets

OTHER PUBLICATIONS

California Energy Commission, California Standards for External Power Supplies, Mar. 3, 2005, 4 sheets.
Power Integration, TNY 263-268 TinySwitch-II Family Enhanced, Energy Efficient Low Power Off-line Switcher, data sheet, Apr. 2005, pp. 1-24.
David Friedman, Declaring Oil Independence, reprinted from Oct./Nov. 2005 issue of Mother Earth News, Oct. 5, 2005, 2 sheets.
Energy Star, Test Methodology for Determining the Energy Performance of Battery Charging System,Draft, Oct. 2005, pp. 1-5.
Andrew Fanara, Letter from the United States Environmental Protection Agency Office of Air and Radiation, Oct. 17, 2005, 2 sheets.
Bill Moore, The Potential of Plug-in Hybrids, EV World, Oct./Nov. 2005, 4 sheets.
Instructables, MintyBoost!—Small battery-powered USB charger, May 30, 2006, 20 sheets, http://www.instructables.com/id/EGBQJPLCB2EP287KTZ/?ALLSTEPS.
Will Anderson, How Much Electricity Do You Waste At Home? A New Meter Reveals The, The (London) Independent, Jun. 21, 2006, 3 sheets.
Power Integrations, TOP242-250 TOPSwitch-GX Family Extended Power, Design Flexible EcoSmart, Integrated Off-line Switcher, data sheet, Nov. 2005, pp. 1-52.
Power Integrations, Recent Technology Advancements in Reducing Standby Power, presentation, Nov. 2006, slides 1-21, www.powerint.com.
USB-IF, Battery Charging Specification, Mar. 8, 2007, pp. cover page-25, rev. 1.0.
Nokia, Nokia becomes the first phone maker to add energy saving alerts to mobiles, Nokia press release, May 10, 2007, 1 sheet, www.nokia.com.
Energy Star, Energy Star Program Requirements for Products with Battery Charging Systems (BCSs) Draft 2 Eligibility Criteria, downloaded Jul. 24, 2007, pp. 1-9.
Energy Star, Energy Star Program Requirements for Single Voltage External Ac-Dc and Ac-Ac Power Supplies Eligibility Criteria, downloaded Jul. 26, 2007, pp. 1-6, version 1.1.
Matt Chapman, Carphone Wharehouse leads to green charge, Absolute Gadget, Sep. 4, 2007, 1 sheet, http://www.absolutegadget.com/index2.php?option=com_content&task=view&id=753&pop...
Patent Cooperation Treaty (PCT), International Search Report and Written Opinion for Application No. PCT/US2008/009797, filed Aug. 15, 2008, mailed Mar. 3, 2009, Korean Intellectual Property Office, Republic of Korea.
Patent Cooperation Treaty (PCT), International Search Report and Written Opinion for Application No. PCT/US2007/024133, filed Nov. 19, 2007, mailed Aug. 20, 2008, European Patent Office, Netherlands.
Maxim Integrated Products, SOT23 Dual-Input USB/AC Adapter 1-Cell Li+ Battery Chargers, MAX1551/MAX1555, Jul. 2003, pp. 1-7, Rev. 0, USA.
Morison, David. Battery-Charger ICs are Tailored for Latest Application, Power Electronics Technology, May 2005, pp. 54-55, www.powerelectronics.com.
Wikipedia, The Free Encyclopedia, Universal Serial Bus, page last modified Nov. 10, 2006, 28 pages, http://en.wikipediattp.org/wiki/usb_connection.
Think Geek, Fundue—desktop USB Fondue set main description, downloaded on or before Nov. 12, 2006, 3 pages, http://www.thinkgeek.com/stuff/41/fundue.shtml.
Think Geek, George Foreman, USB iGrill main description, downloaded on or before Nov. 27, 2006, 2 pages, http://www.thinkgeek.com/stuff/loofirpa/igrill.shtml.

POWER SUPPLY THAT SUPPLIES POWER TO AND COMMUNICATES WITH AN ELECTRICAL APPLIANCE

BACKGROUND

The present application relates to electrical appliances and power supplies therefor.

Recent years have seen a proliferation of portable electrical appliances. Digital cameras, media players, mobile telephones, and global positioning system (GPS) devices are but a few examples of this trend. In many cases, these devices are provided with a power adapter that converts power from a power source such as an alternating current (AC) power line to a form used by the appliance.

Unfortunately, losses in the power adapter can degrade the energy efficiency of the system. This problem is exacerbated by the fact the power adapters are often left connected to the input power source for extended periods of time.

In the ubiquitous case of a mobile telephone, for example, the phone is connected to a power adapter, at which the point an onboard charger may enter an active charging mode in which the batteries are brought to a fully charged state. If the phone is not disconnected from the power adapter, the charger may enter a maintenance mode in which power from the adapter is used to maintain the battery state of charge. At some point, the mobile phone is typically disconnected from the adapter and used as desired. Nonetheless, the charger is often not unplugged from the power outlet.

Another trend has been an increased emphasis on energy efficiency. As result, manufactures have sought to improve the energy efficiency of their power adapters, for example by using relatively more efficient electrical components and circuit configurations such as switched mode power converters. In the U.S., these efforts have gained increasing visibility through the Energy Star® program promulgated by the U.S. Environmental Protection Agency. Those products that meet certain energy efficiency criteria may receive the Energy Star qualification and display the Energy Star certification mark. See, e.g., Energy Star Program Requirements for Products with Battery Charging Systems (Draft 2); Energy Star Program Requirements for Single Voltage External AC-DC and AC-AC Power Supplies (Draft 1.1).

Nonetheless, there remains room for improvement.

SUMMARY

Aspects of the present invention address these matters, and others.

According to a first aspect, a power supply includes a power converter and a communication interface. The power converter receives electrical power from an input power source and supplies electrical power to an electrical appliance. The communication interface is configured for communication with the electrical appliance and a component of the power supply.

According to another aspect, an apparatus includes a power converter that uses electrical power from an AC power line to supply electrical power for charging a secondary battery. The apparatus also includes a power converter disconnect that disconnects at least a portion of the power converter from the AC power line as a function of the state of charge of the secondary battery so as to reduce a power dissipated by the power converter during a time in which the secondary battery is not being charged.

According to another aspect, an electrical appliance includes a charger that uses power from a power supply to charge a rechargeable power source. The electrical appliance also includes at least one of a power converter disconnect requester and a temporal load shifter.

According to another aspect, an apparatus includes a first apparatus portion that includes a first housing, a power converter housed by the first housing, and a first electrical connector. The apparatus also includes a second, human portable apparatus portion that includes a second housing, a rechargeable power source receiving region, and a charger that uses power from the power converter to charge a rechargeable power source received in the receiving region, and a second electrical connector that provides a removable electrical connection with the first electrical connector. The receiving region and the charger are housed by the second housing. The apparatus also includes at least one of a power converter disconnect that disconnects the power converter from an input power source as a function of the state of charge of the rechargeable power source, a load shifter that temporally shifts an electrical load presented by charger, a power supply capability determiner that determines a power capability of the first appliance portion, and a load prioritizer that prioritizes an electrical load presented by the charger.

According to another aspect, a method of using a power supply including a power converter and a communication interface is provided. The method includes using the power converter to supply electrical power to a first electrical appliance and receiving a first signal from the first electrical appliance via the communication interface.

Those skilled in the art will recognize still other aspects of the present invention upon reading and understanding the attached description.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
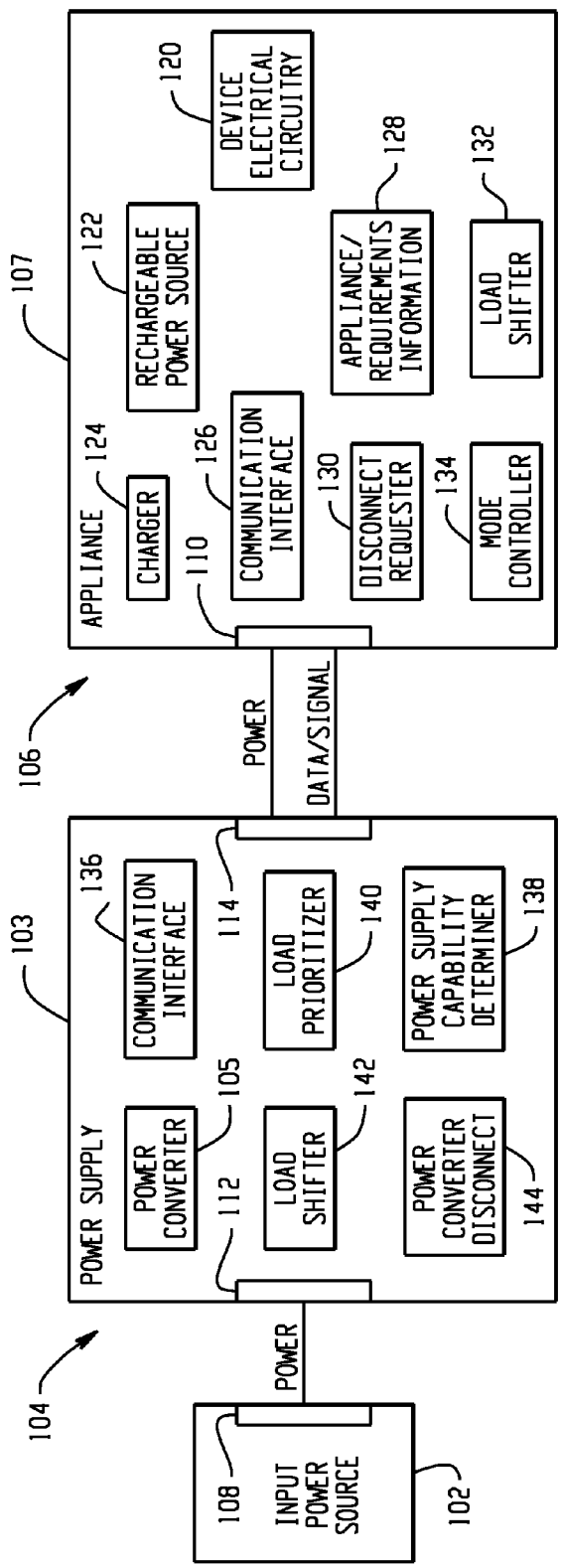
FIG. 1A depicts a power source, power supply, and electrical appliance.

With reference to FIG. 1, an apparatus 100 includes a power supply 104 and an electrically powered appliance 106.

The electrically powered appliance 106 may be any device that is powered by electrical power, including but not limited to devices configured for use in the consumer, commercial, or industrial environments. Non-limiting examples of electrically powered appliances 106 include devices such as cellular or mobile telephones, domestic appliances, cordless telephones, answering machines, lighting devices, music or media players, personal digital assistants (PDAs), laptop, handheld, or notebook computers, optical bar code or other scanners, communications equipment, global positioning system (GPS) devices, and portable test and measurement equipment. Preferably, however, the electrical appliance 106 is configured as a human-portable device including a housing 107 that can be carried by, or otherwise moved under the power of, a human user.

As illustrated, the appliance 106 includes an electrical connector 110 that provides removable data and power connections to the power supply 104 or other external device(s) via suitable wires or cables. The connector 110 may also be configured to include multiple connectors (e.g., physically separate data and power connectors). Power and data may also be transferred over the same wire(s) (e.g., using a suitable modulation scheme) or suitable wireless connection(s). Device electrical circuitry 120 performs a function of the appliance 106.

As will be described further below, the appliance 106 may also include a rechargeable power source 122 such as one or more secondary (rechargeable) batteries, capacitive energy storage devices, or the like that supply operating power to the device electrical circuitry 120, as well as a charger 124 that charges the storage device 122. As will also be described further below, the appliance may also include one or more of appliance power requirements or other information 128, a disconnect requester 130, a load shifter 132, and a mode controller 134.

The power supply 104, which is likewise configured to be human-portable and includes a housing 103, receives electrical power from an input power source 102 such as a standard 120/240 volt alternating current (VAC) 50/60 Hertz (Hz) power outlet, a vehicular power system such as a nominal 12 volt direct current (VDC) automobile electrical system, a renewable energy source such as a solar or wind source, mechanical source such as crank or vibration source, an infrared (IR) or heat source, an electromagnetic source, or other source of electrical power. The input power source 102 typically includes an electrical connector 108 such as a standard wall or other electrical outlet, a 12 VDC power socket, or the like that allows various devices to be removably connected to the power source 102. While the power supply 104 power rating is typically a function of the electrical appliance(s) 107 with which it is designed to operate, ratings ordinarily range between about 2 and 150 Watts (W), and often toward the lower end of the range.

The power supply 104 also includes an input power connector 112 such as a standard AC plug, 12 VDC power plug, or the like that matingly engages or otherwise connects to the connector 108 of the input power source 102. A power converter 105 converts power from the input power source 102 to the voltage and/or current levels required by the appliance 106. Also in the illustrated embodiment, the power supply 104 includes a connector 114 that connects to the connector 110 of the appliance 106. While only a single connector 114 and appliance 106 is illustrated, it will be understood that the power supply 114 may include a plurality of connectors 114 or otherwise be configured to concurrently connect with a plurality of appliances.

Examples of suitable power converters 105 include linear and switched-mode power converters. Linear power converters are well suited for use with AC input sources 102 and typically include an input transformer that operates at the frequency of the input power source 102 (e.g., 50/60 Hz in the case of a power supply 104 configured to operate with a standard AC power outlet). Switched-mode power converters typically include a relatively high speed semiconductor or other switch operatively connected to a reactor such as an inductor or capacitor.

Various linear and switched mode power converter topologies are known in the art and may selected based on application specific requirements. While linear power converters tend to be simple and robust, they also tend to be relatively bulky and inefficient. Though more complex, switched mode power converters are as a rule smaller and more energy efficient than comparable linear power converters. Moreover, switched mode power converters are generally better suited for use where the input power source 102 is a direct current (DC) source or where the power supply 104 is designed to operate with multiple power sources 102 (e.g., with both 120 VAC/60 Hz and 240 VAC/50 Hz systems).

Figure 1B:
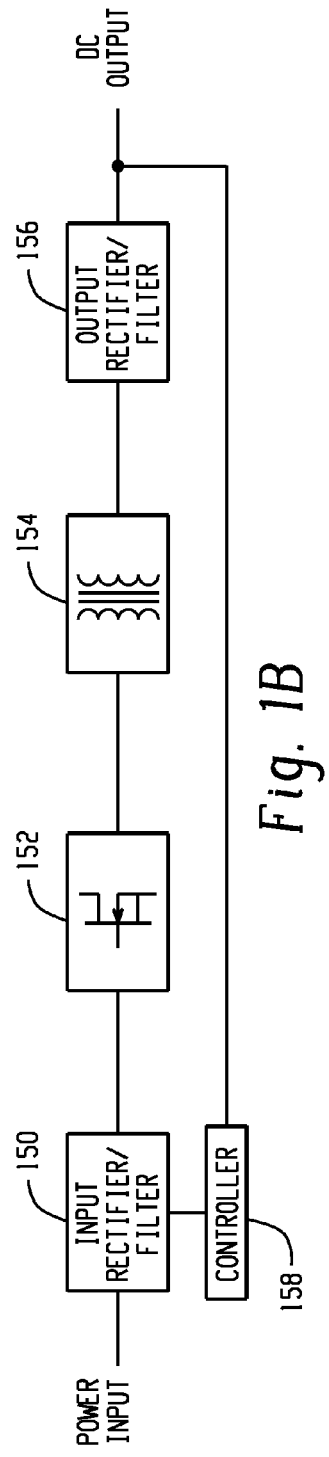
FIG. 1B depicts a prior art switched mode power converter.

A block diagram of an example switched mode power converter that includes closed loop feedback control is shown in FIG. 1B. As illustrated, an input rectifier and/or filter 150 receives input power from a source such as the AC power mains, and the output of the rectifier is provided to a switch 152 that serves as an inverter or chopper. The chopper, which typically operates at a switching frequency on the order of tens to hundreds of kilohertz (KHz), is connected electrically in series with the primary winding of a transformer 154, and the transformer secondary winding(s) is connected to an output rectifier(s) and/or filter(s) 156 that produce a DC output signal. A closed loop controller 158 controls an operation of the chopper 152 so as to regulate the power converter output voltage.

As will be described further below, the power supply 104 may include one or more of a communication interface 136 that communicates with a connected appliance 106, a power supply capability determiner 138 that determines or otherwise provides time varying or static information indicative of a power capability of the power supply 104 and/or a connected power source 102, a load prioritizer 140 that prioritizes power provided to multiple appliances 106 in the case of a power supply 104 configured to concurrently connect to more than one appliance 106, a load shifter 142 that shifts a load presented to the power supply 104 and/or the connected power source 102, and a power converter disconnect 144 that selectively disconnects at least a portion of the power converter 105 from the input power source 102.

Figure 2A:
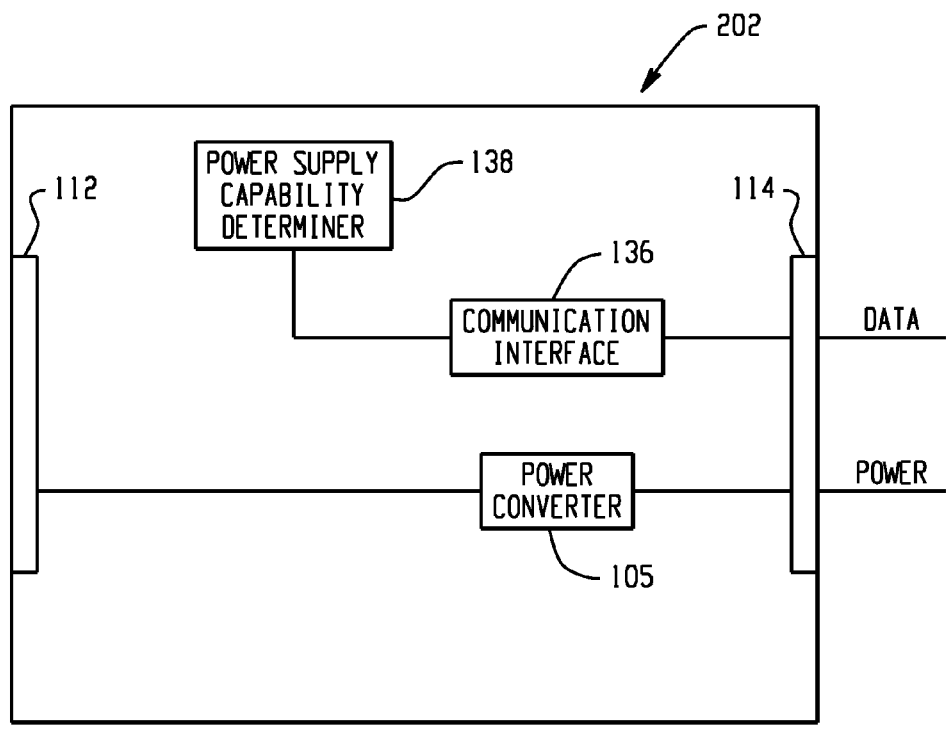
FIGS. 2A-2D depict power supplies.

Various examples of the power supply 104 and appliance 106 will now be described, it being understood that the described features and combinations of features are provided for the purpose of illustration and may be selected or varied by one of ordinary skill in the art upon reading and understanding the present description. Turning now to FIG. 2A, a power supply 202 is configured for power and data communication with a connected appliance 106. As illustrated, the power supply 202 includes power supply capability determiner 138, a communication interface 136, and a power converter 105.

The communication interface 136 provides uni- or bi-directional communication with a connected appliance 106. In one implementation, the communication interface 106 is a universal serial bus (USB) interface, the power supply 202 serves as a USB powered host, and the connector 114 is a standard USB connector though which data and power are provided to a connected appliance 106. Note that other serial, parallel, analog and digital communications interfaces 106 are also contemplated.

The power supply capability determiner 138 determines or otherwise provides information indicative of the capabilities of the power supply 202 and/or an input power source 102. In one example, the information is static information describing a voltage, current, or power rating of the power supply 202 or a power source 102. In another, the information includes model number or similar identifying information that serves as a proxy for the power supply 202 capabilities.

The power supply 202 capabilities, and hence the capability information, may also be time varying. Where the power supply 202 receives power from a solar or wind source, for example, the power available from the power converter 105 will typically vary as a function of factors such as incident light or wind speed.

The determined power supply capability may be communicated to a connected device 106 via the communication interface 206, for example when an appliance 106 is initially connected to the power supply 202, from time-to-time during operation of the devices, or the like.

Figure 2B:
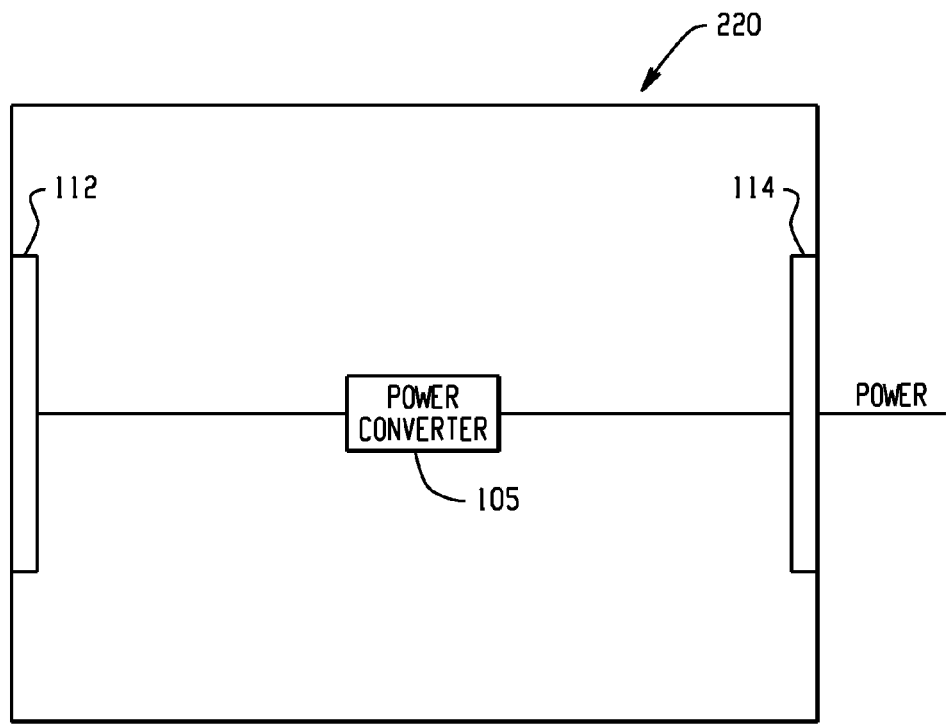

Turning now to FIG. 2B, a second example power supply 220 is configured for power communication with a connected appliance 106. While the power supply includes a power converter 105, it lacks a communication interface. As a consequence, the power supply 220 does not support communication with a connected appliance 106 that includes communication capabilities.

Figure 2C:
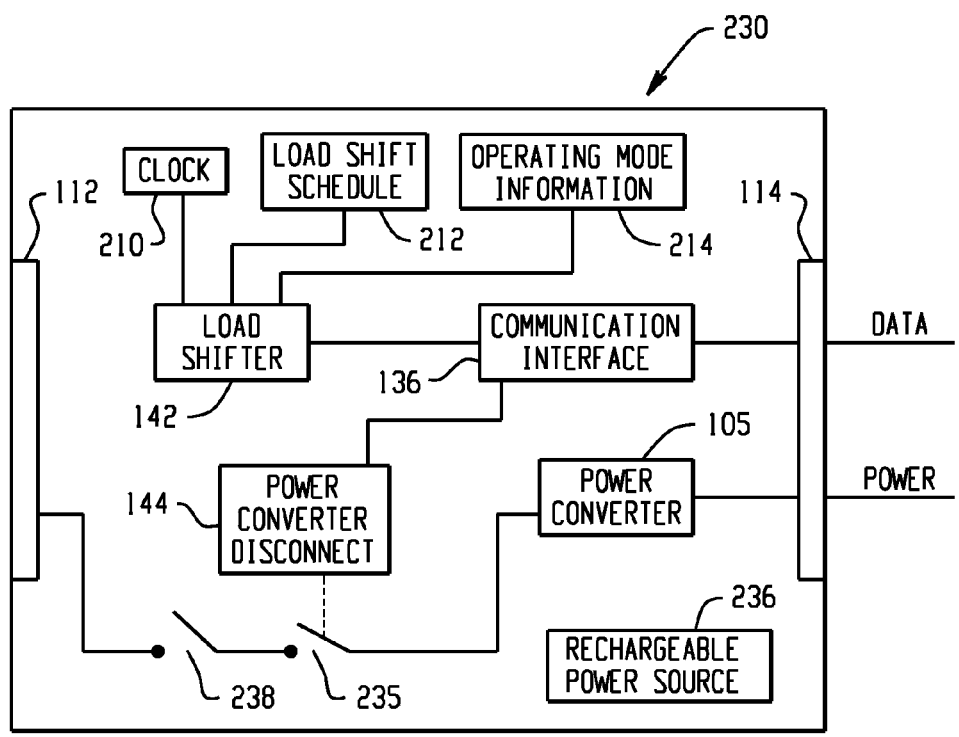

Turning now to FIG. 2C, a third example power supply 230 is configured for data and power communications with a connected appliance 106. As illustrated, the power supply 230 includes a power converter 105, a communication interface 136 a load shifter 142, and a power converter disconnect 144.

In some situations, it may be desirable to shift an electrical load presented to the power source 102 by the power supply 230 and a connected load 106 from a period of relatively high power demand (e.g., in the middle of the day for a typical electrical power grid) or limited power availability (e.g., in the middle of the night in the case of a solar power source 102) to a period of relatively reduced demand or increased availability. To this end, the load shifter 142 may be employed to defer, bring forward, or otherwise shift an operation of the appliance 106 from a time of high or peak demand or limited power availability to a time of relatively lower demand or greater power availability. Information regarding desired operating mode and/or load shifting operations may be communicated to and/or from a connected appliance 106 via the communication interface 136, for example by sending suitable commands and/or signals to the appliance 106.

The power supply 230 may also include a real time or other clock 210, load shift schedule 212, and device operating mode information 214. The load shift schedule 212 includes desired starting and ending time(s) or other parameters relevant to a load shifting operation. The operating mode information 214 provides information indicative of possible operating mode(s) of appliance(s) 106 which the power supply 230 is designed to operate.

Power converters 105 typically draw power from the input power source 202 even where the power converter 105 is (substantially) unloaded, for example due to the non-ideal characteristics of transformers, switching devices, reactors, and other practical components. This power is ordinarily dissipated in the form of heat, and degrades system energy efficiency.

The power converter disconnect 144 selectively disconnects the power converter 105 from the input power source 102. As illustrated, the power converter disconnect 144 is operatively connected to a switch 235 such as an electromechanical switch or relay, semiconductor switching device, or the like located electrically in series between the input power source 102 and the power converter 105.

Though illustrated as being located at the input of the power converter 105, the switch 235 may be integral thereto. In one such example, the switch 235 is also the inverter or chopper of a switched mode power converter, and the operation of the switch 235 is selectively enabled or disabled via suitable logic or other circuitry so as to disconnect some or all of the power converter 105 from the input power source 102. In another, the switch 235 is located after a rectifier and/or filter. The power converter disconnect 144 can be employed to automatically (i.e., without user intervention) reduce a power drawn by the power supply 230 from the power source 102 during periods of inactivity or reduced load, for example in the case of a connected appliance 106 that can be operated from a battery or other power source internal to the appliance 106 while in a low power operating mode, when a secondary (rechargeable) battery or other power source of the appliance 106 is fully or otherwise substantially charged, when an appliance 106 is not connected to the power converter 105, in coordination with a load shifting operation, or the like.

The power supply 230 may include a rechargeable power source 236 that provides power to desired portions of the power converter 230 when the power converter circuit 105 is disabled. Operating power may also be obtained from the connected appliance 106 or a portion of the power converter circuit 105 that is not disabled. Note that the power supply 230 may also include a user operated power switch 238 that allows the user to manually disconnect the power supply 230 from the input power source 102.

Figure 2D:
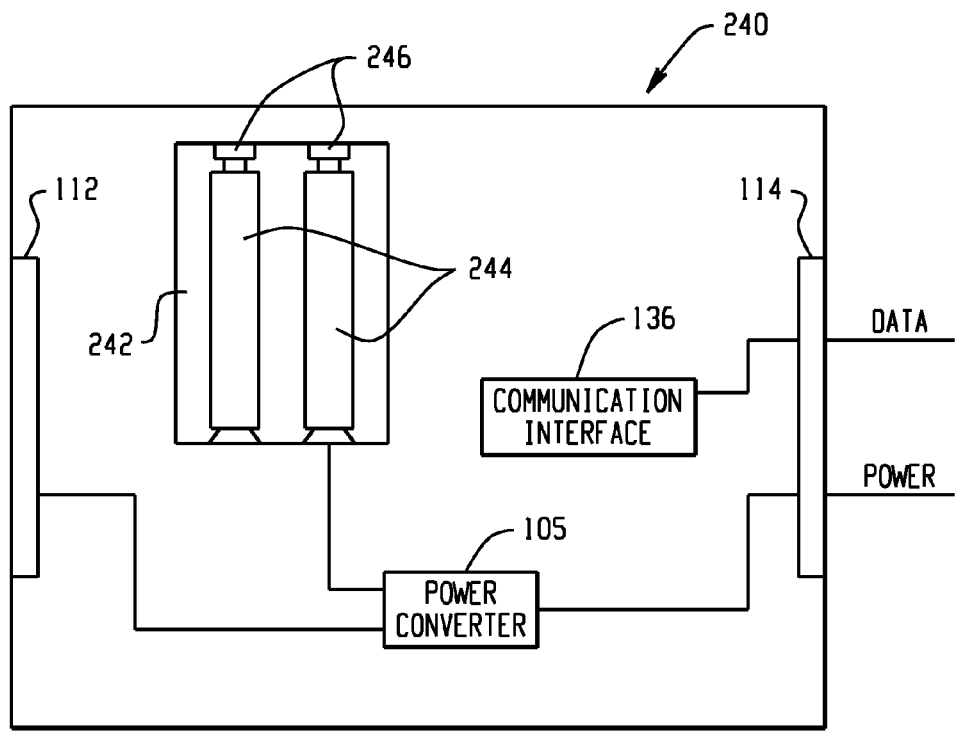

Another example of a power supply 240 configured for power and data communication with a connected device is shown in FIG. 2D. As illustrated, the power supply 240 includes as battery receiving region 242 configured to receive one or more generally cylindrical AAA, AA, C, D-size, or other suitable batteries. Battery contacts 246 make electrical contact with the battery 244 terminals. In one implementation, the batteries 244 supplant the power source 102, in which case the connector 112 may be omitted. In another, the batteries 244 supply electrical power in the event of a power loss, if the power supply 240 is unplugged, or the like. While not explicitly illustrated in FIG. 2D, it will be understood that the power supply 240 may also include one or more of the power supply capability information 138, load shifter 142, power converter disconnect 144, or load prioritizer 140.

Figure 3A:
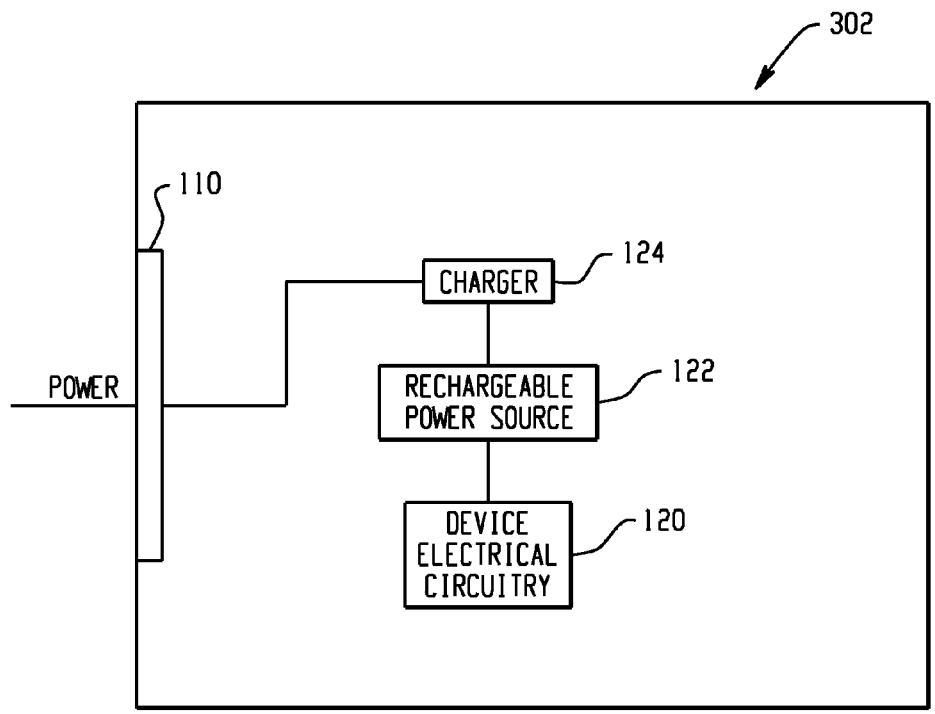
FIGS. 3A-3D depict electrical appliances.

A first example electrically powered appliance 302 configured for power communication with a power supply 104 is shown in FIG. 3A. As illustrated, the appliance 302 includes device electrical circuitry 120, a rechargeable power source 122, a charger 124, and a connector 110. The charger 124 includes a state of charge detector that detects a state of charge of the energy source, for example by measuring a source voltage or current or, in the case of a timer based charger, an elapsed charging time. Note that the device electrical circuitry 120 may be omitted and the appliance 302 configured as a battery charger, in which case the appliance 302 ordinarily includes a battery receiving region 242 and battery contacts 246 analogous to those described above in relation to FIG. 2D and configured to accept batteries of the number and size(s) to be charged. According to such an implementation, batteries are ordinarily inserted in the battery receiving region 242 for charging and removed for use in another device.

As the appliance 302 lacks a communications interface, the appliance 302 does not support communication with a power supply 104 that includes communication capabilities.

Figure 3B:
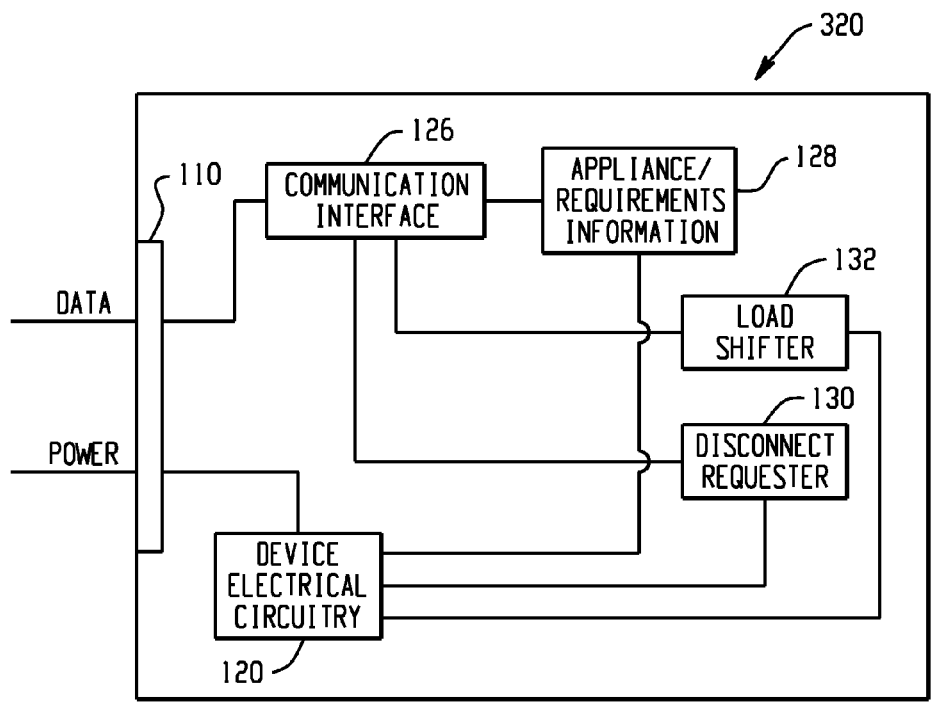

A second example electrically powered appliance 320 configured for power and data communication with a power supply 104 is shown in FIG. 3B. As illustrated, the appliance 320 includes a connector 110, a data communication interface 322, device electrical circuitry 120, appliance requirements information 128, a load shifter 132, and a disconnect requester 130. Where the voltage and/or current requirements of the device electrical circuitry 120 differ from those provided by a connected power supply 104, an optional power converter may be used to convert the power from the power supply 104 to the required voltage and/or current levels.

The load shifter 132 performs a temporal load shifting operation and may operate in conjunction with one or more of an onboard clock(s), load shift schedule, and operating mode information. The load shifter 132 causes the appliance 320 to perform a load shifting operation. In one example, the load shifting is performed in response to a request communicated by a connected power supply 104 via the respective communications interfaces. In another example, the load shift operation is initiated by the load shifter 132 and optionally communicated to a connected power supply 104.

The disconnect requester 130 generates a signal or other request to cause some or all of the power converter 105 of a connected power supply 104 to disconnect from its input power source 102. In one example, the disconnect request is generated when the device electrical circuitry 120 enters an inactive state or mode. Where, as illustrated, the appliance 302 lacks an energy storage device, initiating a disconnect request will ordinarily de-power the device electrical circuitry 120.

Figure 3C:
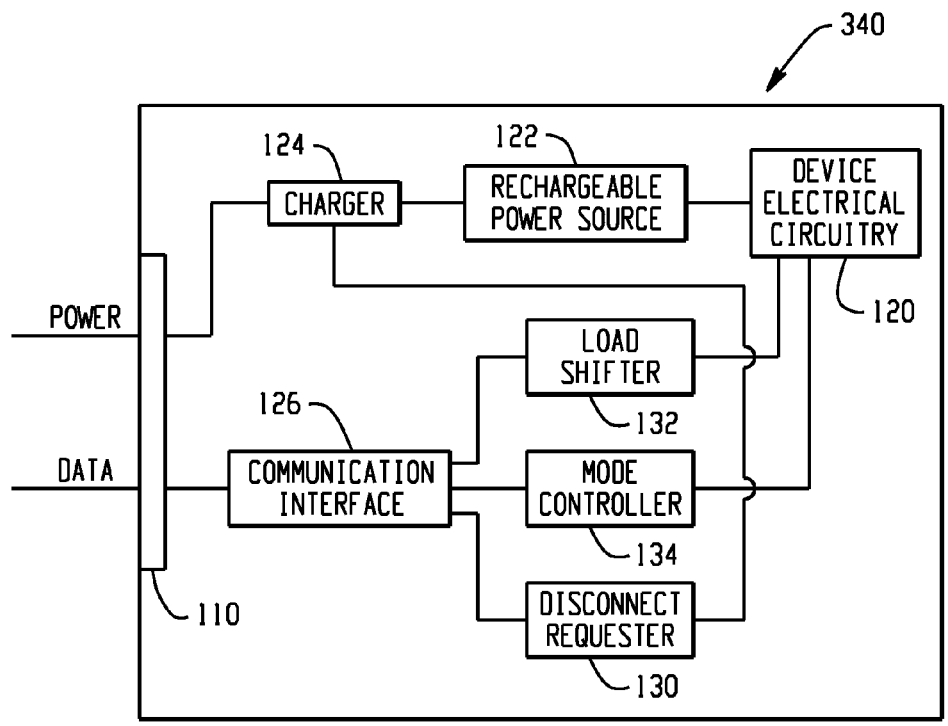

Another example of an electrically powered appliance 340 configured for data and power communication with a connected power supply 104 is shown in FIG. 3C. As illustrated, the appliance 340 includes a charger 124, rechargeable power source 122, and device electrical circuitry. The appliance 340 also includes a communication interface 126, load shifter 132, mode controller 134, and a disconnect requester 130.

As illustrated, the disconnect requester 130 is operatively connected to the charger 124, for example to generate a disconnect request when the rechargeable power source 122 is substantially or otherwise suitably charged. The disconnect requester 130 may also from time-to-time generate a reconnect request, for example to maintain the storage device 122 state of charge.

As the appliance 340 includes an energy storage device 122, at least a portion of the device electrical circuitry 120 remains substantially functional when the appliance 340 is disconnected from a power source 104 or where a power converter 105 is disconnected from the input power source 102.

The mode controller 134 controls an operating mode of the device electrical circuitry 120. In one example, the mode controller 134 varies an operating mode of the appliance in response to a signal generated by a connected power supply 104 and communicated via the respective communication interface. In another example, the mode controller 134 may restrict the device electrical circuitry 120 to a relatively low power or otherwise limited operating mode(s) when the appliance is not connected to a power supply 104.

Figure 3D:
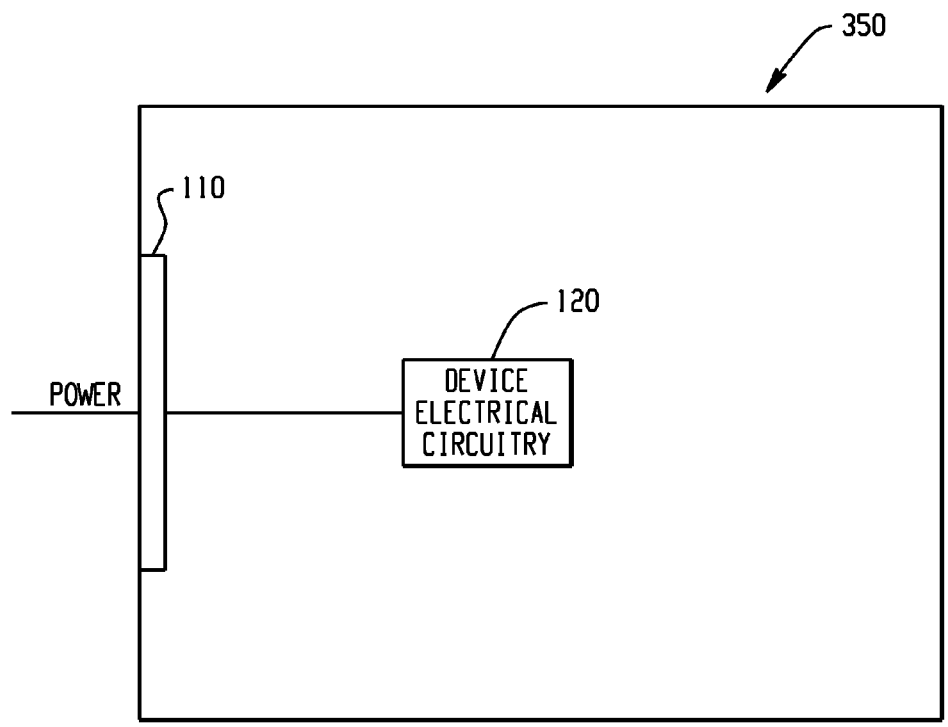

Another example of an electrically powered appliance 350 is shown in FIG. 3D. As illustrated, the appliance 350 includes a connector 110 and a device electrical circuitry 120. As the appliance 350 does not include a communication interface or an energy storage device, the appliance 350 does not support data communication with a connected power supply 104 and is ordinarily non-functional when not connected to a power supply 104.

The various power supplies 202, 220, 230, 240 and electrical appliances 302, 320, 340, 350 may form a family of generally interoperable devices, noting again the features and combinations of features described above are presented for the purpose of illustration and may be varied to suit the requirements of a particular application. Viewed from the perspective of the electrical appliances, a given electrical appliance may be configured to operate with some or all of the power supplies 202, 220, 230, 240. Viewed from the perspective of the power supplies, a given power supply may be configured to operate with some or all of the electrical appliances 302, 320, 340, 350. According to such an implementation, the connectors 114, 110 of the power supplies and electrical appliances are preferably physically compatible, and the communications interfaces operate according to a common communication protocol.

Following their connection, a power supply 104 and electrical appliance 106 undergo a detection and/or identification process (e.g., an enumeration process in the case of devices having a USB interface) in which those devices having a communication interface seek to identify the device to which it is connected and determine power requirements. Where a device having a communication interface is connected to a device that does not include a communication interface or to an otherwise unrecognized device, the communicative device enters into a default or otherwise pre-defined mode of operation. Where two communicative devices are connected, the devices interact accordingly.

Various example interactions will now be presented, it again being understood that the examples should not be construed as limiting the types or configurations of the devices and/or the possible interactions.

Figure 4A:
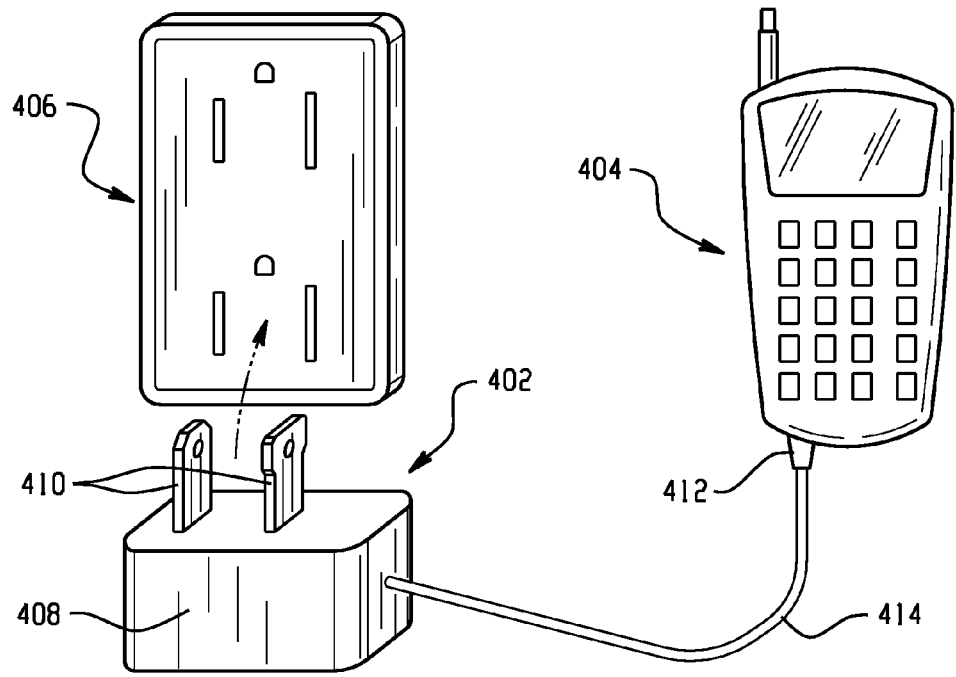
FIG. 4A depicts a power supply and an electrical appliance.

Turning first to FIG. 4A, a power supply 402 is configured as a wall plug adapter that plugs into a standard 120 VAC wall or other outlet 406, and an electrical appliance 404 is a consumer electronic device such as a cellular or mobile telephone that includes a rechargeable battery. As illustrated, the adapter 402 includes a generally rectangular prismatic housing 408 having a standard AC power plug that protrudes from a surface of the housing 408 so as to plug into the outlet 406. A connector 412 located at the distal end of a cable 414 removably engages a corresponding connector of the mobile phone 404.

Figure 4B:
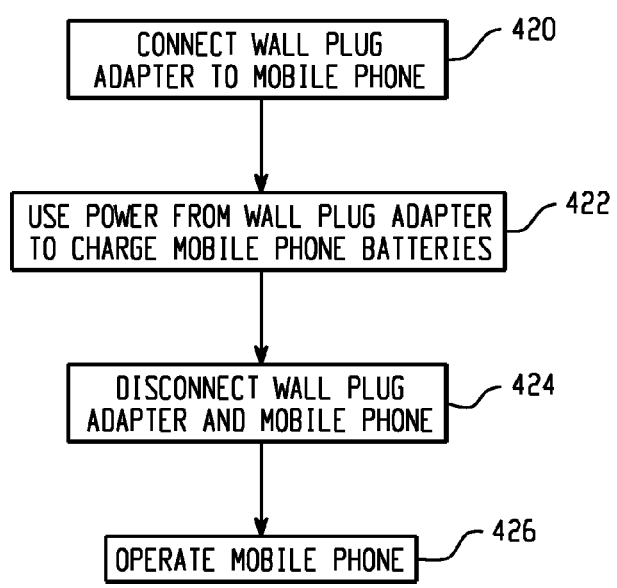
FIGS. 4B and 4C depict interactions between the power supply and appliance.

In a first example, the power supply 402 is configured as described in FIG. 2B and the appliance 404 is configured as described in FIG. 3A. The device 402, 404 interaction will now be described with reference to FIG. 4B, it being assumed that the power supply 402 is already plugged in to the outlet 406. At 420, the power supply 402 and the appliance 404 are connected. At 422, power from the power supply 402 is used to charge the appliance 404 battery. At 424, the devices are disconnected, and the appliance 404 is operated at step 426. Of course, the process may be repeated as desired.

As will be appreciated by those of ordinary skill in the art, the foregoing describes a conventional interaction between a wall plug adapter and a mobile phone. While such an interaction has proven to be effective for charging the appliance 404 battery, there nonetheless remains room for improvement. For example, the power converter circuitry 105 of the wall plug adapter 402 remains connected to the power mains 406 even after the battery of the mobile phone 404 is substantially fully charged, thus reducing the overall energy efficiency of the arrangement. Trickle charging of the battery, if provided, further reduces the energy efficiency. Moreover, such an arrangement does not support operations such as load shifting.

Figure 4C:
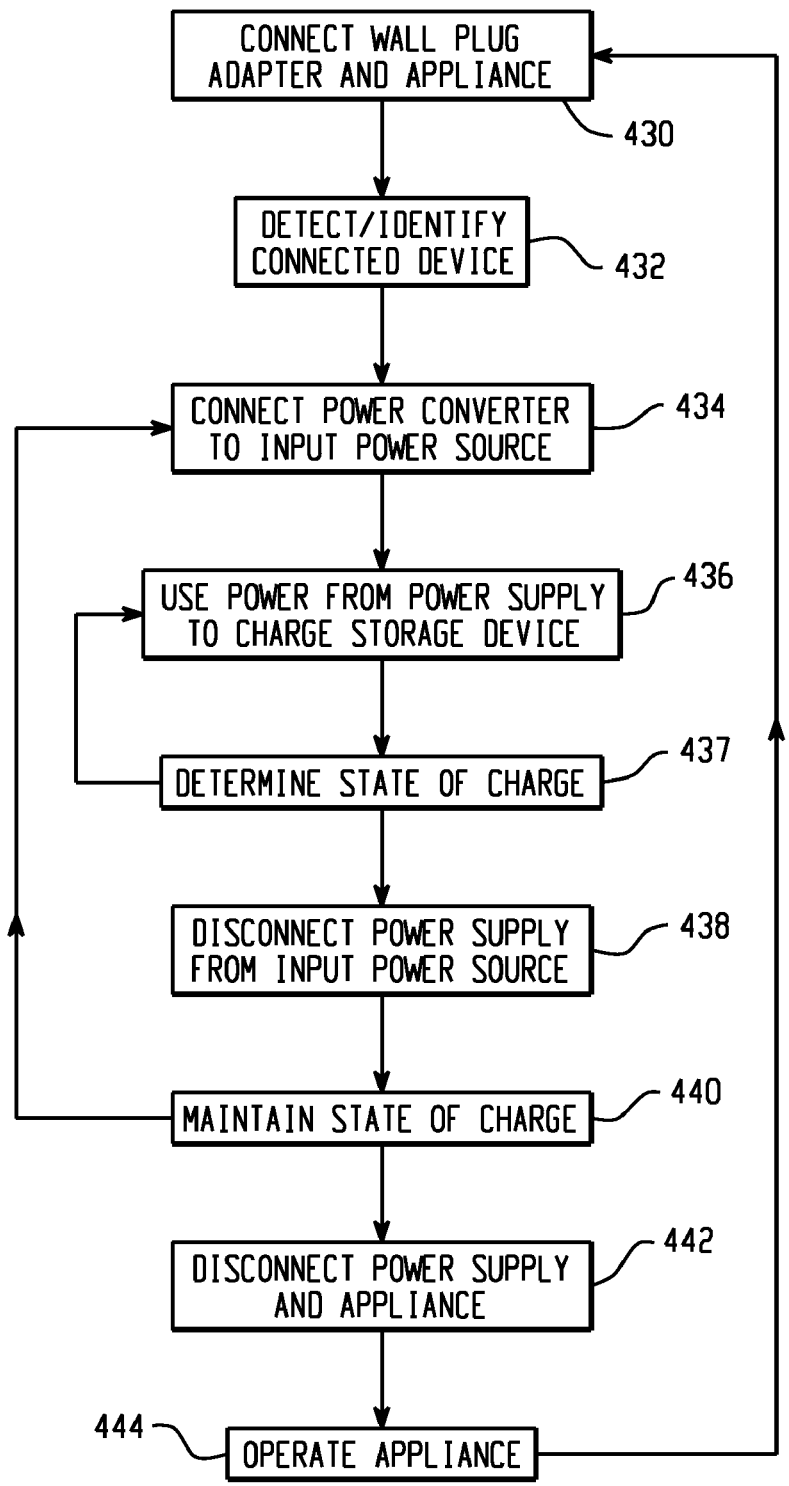

In a second example, the wall power supply 402 is configured as described in FIG. 2C, while the appliance 404 includes a charger 124, rechargeable power source 122, device electrical circuitry 120, a communications interface 126, and a disconnect requester 130. A device 402, 404 interaction that includes a power supply disconnection and reconnection operation will now be described with reference to FIG. 4C, it again being assumed that the power supply 402 is already plugged into the outlet 406 but that the power converter 105 is disconnected from the AC power line.

The power supply 402 and appliance 404 are connected at step 430.

At 432, the devices undergo a detection and/or identification procedure 432, for example to detect the other the connected device and identify its capabilities.

The power supply power converter 105 is connected to the AC power line at step 434.

At 436, the power supply 402 supplies power to the appliance 404, with the supplied power being used to charge the storage device 122.

The state of charge of the storage device 122 is determined at 437, for example by monitoring a device 122 voltage or current, determining an elapsed charge time in the case of a timer based charger, or the like. If the storage device 122 is not sufficiently charged, the charging process continues at step 436.

If the storage device 122 is substantially or otherwise sufficiently charged, at least a portion of the power converter circuit 105 is disconnected from the AC power mains 406 at step 438. In one example, a disconnect, charge complete, or other suitable signal is communicated from the appliance 404 to the power supply 402 via the devices' respective communication interfaces. Note that appliance 404 may be configured to communicate such a signal even though the power supply 402 does not include a communication interface or support a power converter disconnection operation, in which case the request would not be honored. In another example, the state of charge detector is included in the power supply 402, and the power converter 105 is disconnected accordingly.

The storage device 122 state of charge is maintained at step 440. For example, the state of charge may be determined as described above in step 437. If a maintenance or additional charge is required, a connect, charge required, or other suitable signal may be communicated to the power supply 402 via the communication interfaces. Where the state of charge is monitored by the power supply 402, the power converter 105 is connected accordingly. The process returns to step 434.

At 442, the appliance 404 and power supply 402 are disconnected, and the appliance 404 is operated at step 444. Note also that the disconnection of the appliance may be detected and the power converter disconnected accordingly. The process may be repeated as desired.

As will be appreciated, disconnecting the power converter 105 during periods of inactivity, in which the electrical appliance 404 presents a relatively low load, or where the appliance 404 is not connected to the power supply 402, and reconnecting the power converter from time-to-time on an as needed basis tends to improve the overall energy efficiency of the system. It will also be understood that the process be used in connection with appliances other than mobile phones and the connection and reconnection performed for purposes other than maintaining a battery state of charge. Thus, for example, the appliance 404 may alternate between a relatively low power or sleep mode and a relatively higher operating mode, with the power converter 105 being disconnected and reconnected accordingly.

Figure 5A:
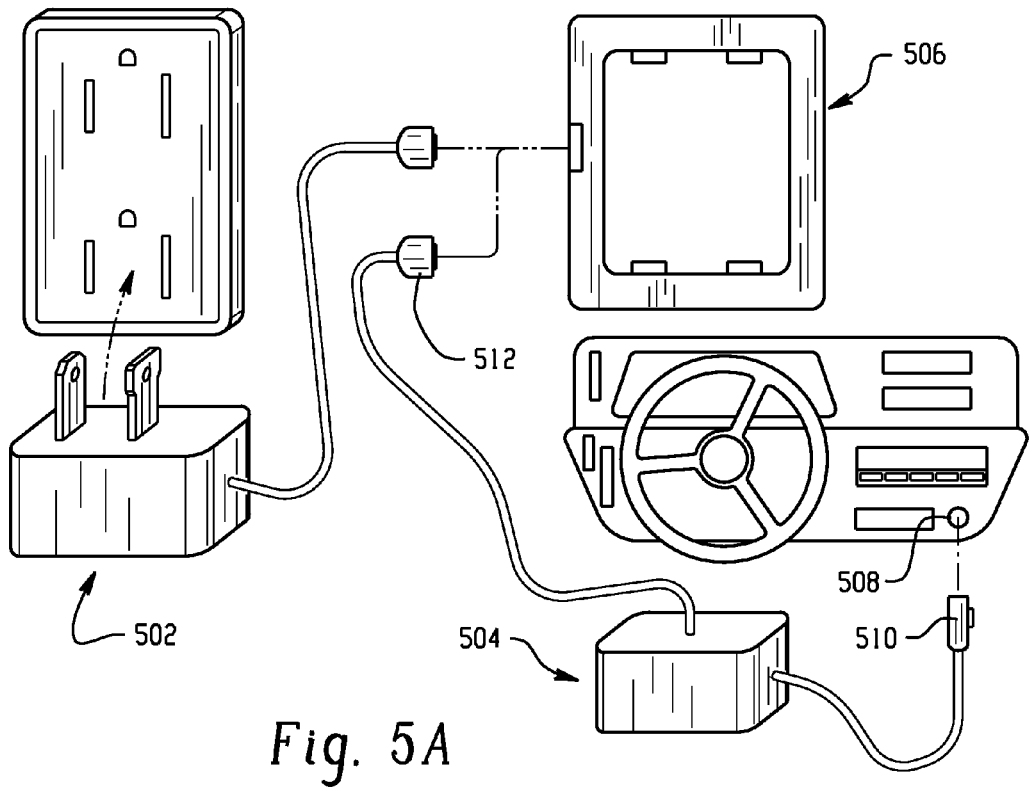
FIG. 5A depicts first and second power supplies and an electrical appliance.

Turning now to FIG. 5A, an example family of devices includes a first power supply 502, a second power supply 504, and an electrical appliance 506. As illustrated, the first power supply 502 is a wall plug adapter similar to that described above in connection with FIG. 4A. The second power supply 504, which is configured to connect to an input power source having a relatively lower power capability such as a power port 508 of a 12 VDC vehicular power system, includes a standard 12 VDC power connector 510 and an appliance connector 512.

The electrical appliance 506 includes at least a first relatively high power operating mode and a second relatively low power operating mode. Where the appliance 506 is configured as or includes a battery charger, for example, the electrical appliance may include a relatively high power fast charging mode and a relatively low power slow charging mode. As another example, a lighting appliance may include high and low brightness modes.

Figure 5B:
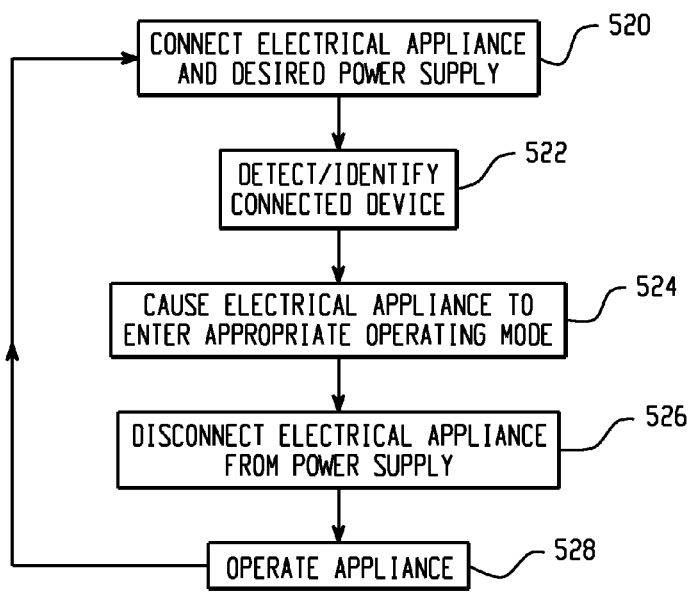
FIG. 5B depicts interactions between the appliance and the power supplies.

In the present example, the first 502 and second 504 power supplies are both configured as described above in relation to FIG. 2A, and the electrical appliance 506 is configured as described in relation to FIG. 3C. An interaction between the appliance 506 and the power supplies 502, 504 that includes a capability determination and operating mode adjustment operation will now be described with reference to FIG. 5B.

The electrical appliance 506 and a desired power supply 502, 504 are connected at step 520.

At 522, the devices undergo a detection and/or identification procedure to determine the capability of the connected power supply 502, 504 and/or its input power source.

At 524, the appliance 506 enters into an operating mode consistent with the determined capabilities of the connected power supply 502, 504. Where the appliance is connected to the first power supply 502, for example, the appliance enters the relatively high power operating mode. If the appliance is connected to the second power supply 504, the appliance 506 enters the low power operating mode.

At 526, the electrical appliance 506 and power supply are disconnected. The appliance is operated as desired at 528. Again, the process may be repeated as desired.

Figure 6A:
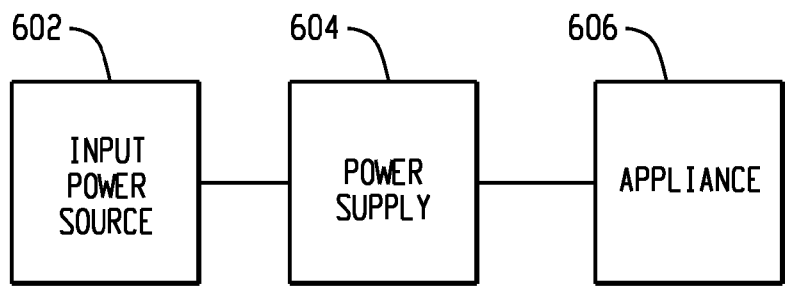
FIG. 6A depicts a power supply and an electrical appliance.
Figure 6B:
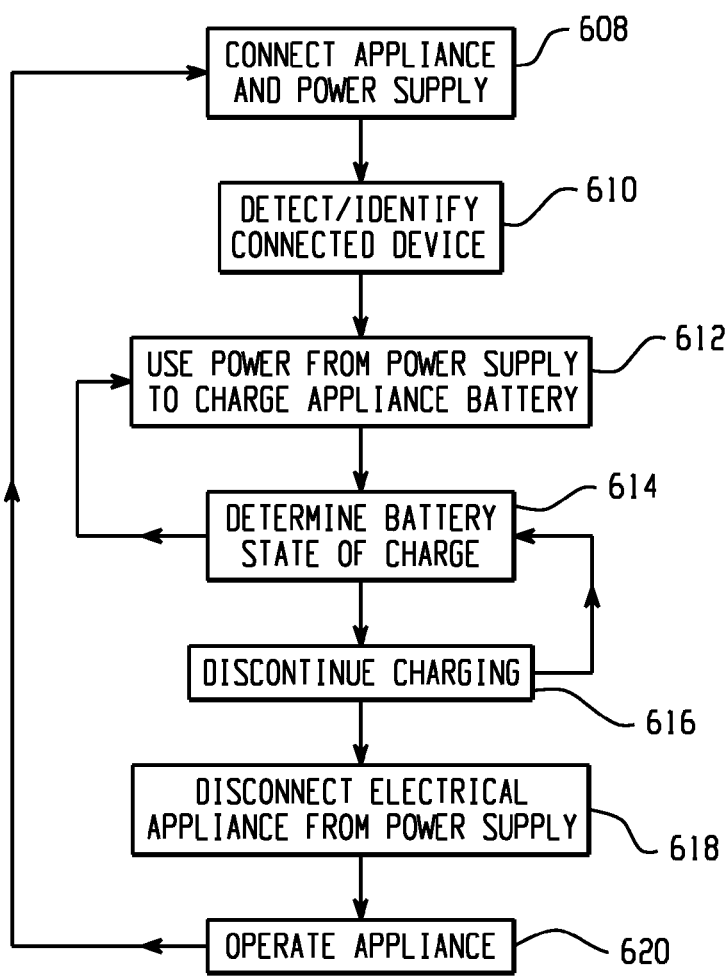
FIG. 6B depicts an interaction between the power supply and the appliance.

Turning now to FIG. 6A, an example input power source 602, power supply 604, and appliance 606 are connected as shown. For the purposes of this example, it will be assumed that the power supply is configured as shown in FIG. 2B and that the appliance 606 is configured as shown in FIG. 3A. An example interaction between the devices that includes a charging discontinuation operation will now be described with reference to FIG. 6B.

The power supply 604 and appliance 606 are connected at 608.

At 610, the connected devices undergo a detection and/or identification procedure. As the power supply 604 does not include a communication interface, the appliance 606 will recognize that it is connected to power supply 604 that does not support communications and enters a suitable default or otherwise pre-defined operating mode.

At 612, power from the power supply 604 is used to charge the appliance 606 battery.

The battery state of charge is determined at 614. If the battery is not substantially or otherwise suitably charged, the process continues to step 612.

If the battery is charged, charging is discontinued at 616, and the process returns to step 614.

The appliance 606 is disconnected from the power supply 604 at 618 and may be operated as desired at step 618. The process may be repeated as desired.

Figure 7A:
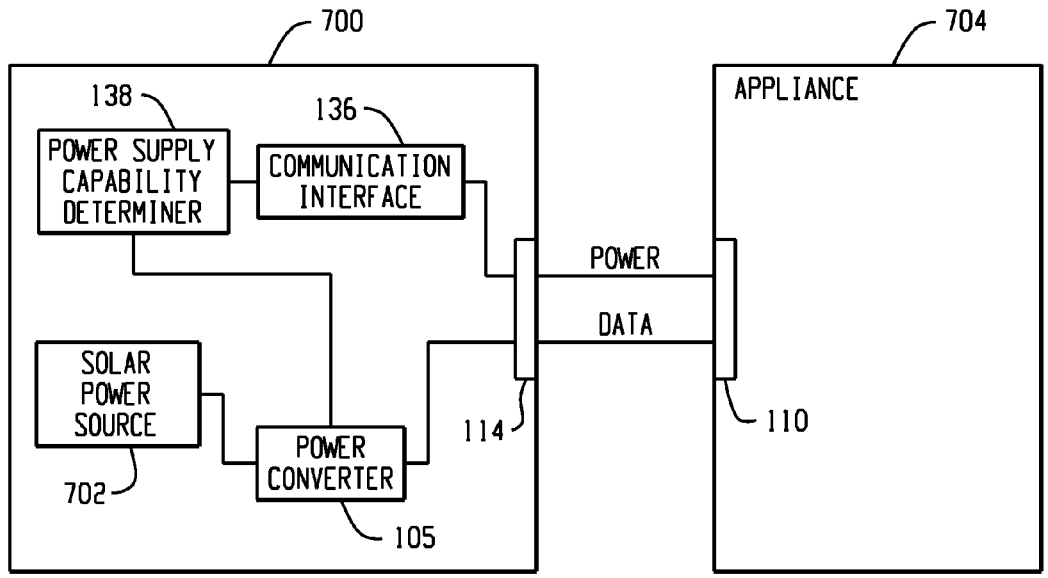
FIG. 7A depicts a power supply and an appliance.
Figure 7B:
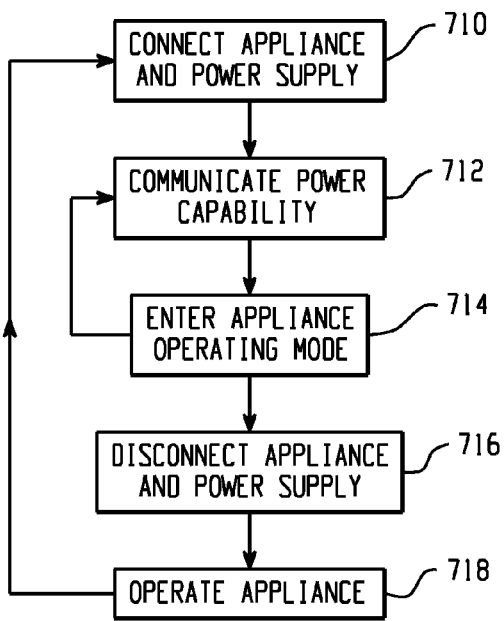
FIG. 7B depicts an interaction between the power supply and the appliance.

Turning now to FIG. 7A, an example power supply 700 includes a solar cell or other solar power source 702, a power converter 105, and power supply capability determiner 138. The appliance 704 is configured substantially as described in FIG. 3C. A device 700, 704 interaction that includes a dynamic power capability determination and operating mode adjustment will now be described with reference to FIG. 7B.

The power supply 700 and appliance 704 are connected at 710.

At 712, the then-current power capability of the power supply 702 is detected and communicated to the appliance 704 via the respective communication interfaces.

At 714, the appliance 704 enters an operating mode consistent with the communicated capability, and the process continues to step 712.

At 716, the appliance 704 and power supply 706 are disconnected, and the appliance is operated as desired at 718. The process may be repeated as desired.

In the preceding example, the appliance 704 is described as including functionality such as a load shifter 132 and disconnect requester 130 that are not supported by the power supply 702. In one implementation, the functions supported by the devices 702, 704 are determined as part of an initial device identification step, with the operation of the appliance 704 adjusted accordingly. In another, the appliance 704 does not determine the functions supported by the power supply 702 and is configured to present load shift, disconnect, or other requests even though such requests may not be recognized or acted upon by the power supply 702.

Figure 8:
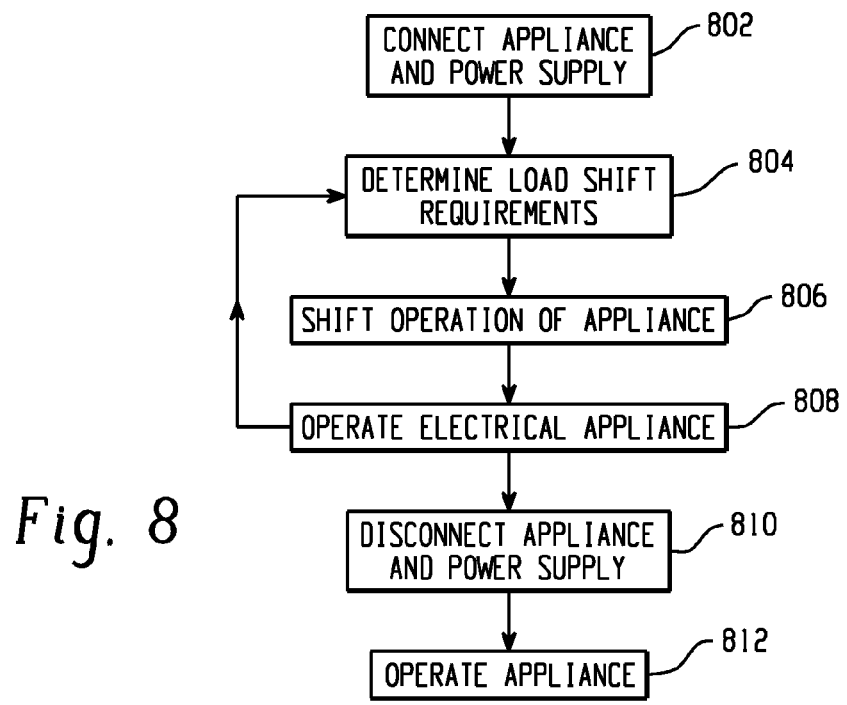
FIG. 8 depicts an interaction between a power supply and an appliance.

For the purpose of another example, it will assumed that the power supply is configured as described in FIG. 2C, while the appliance is configured as described in FIG. 3C. A power supply—appliance interaction that includes a load shifting operation will be described with reference to FIG. 8.

The appliance and power supply are physically connected at 802.

The load shift requirements are determined at 804, for example by reference to a load shift schedule, operating mode, and other information maintained in one or both of the power supply and appliance, with the desired load shift operation being communicated via the respective communications interfaces.

An operation of the appliance is temporally shifted at 806. For example, a desired operation of the appliance may be deferred until a time at which the input power source is subject to a relatively low power demand. In a case where the appliance is a battery charger, for example, a requested charging operation may be restricted to a relatively slow, low power mode during a designated high or peak demand period (e.g., in the middle of the day for a typical AC power system) but permitted to operate in a relatively faster, high power mode during a period of relatively reduced demand (e.g., during the night). The process may be repeated as desired.

In the case of an electrical appliance that includes an energy source, the appliance may also be disconnected from the power supply and operated as desired as indicated at 810 and 812 respectively.

Figure 9:
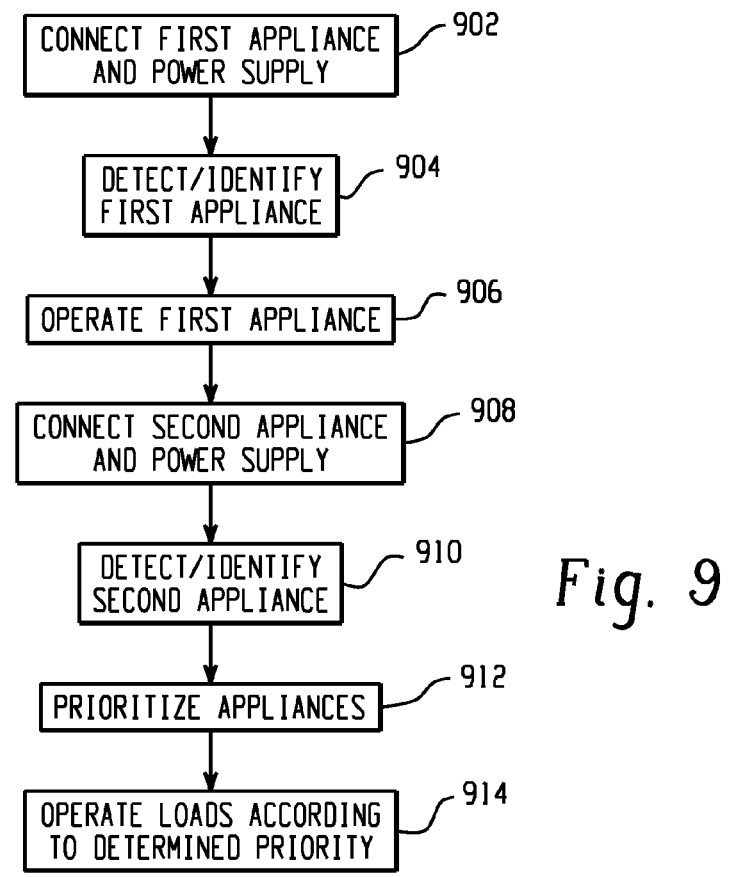
FIG. 9 depicts an interaction between a power supply and an appliance.

An example power supply—appliance interaction that includes a load prioritization information will now be described with reference to FIG. 9, it being assumed that the power supply is configured to concurrently connect to more than one appliance.

The power supply and a first appliance are connected at 902.

The power supply and appliance undergo a detection and/or identification operation at 904. By way of example, the first device may be identified as a portable music player including a rechargeable battery via a signal communicated over the devices' respective communication interfaces.

The first appliance is operated at 906.

The power supply and a second appliance are connected at 908.

The power supply and appliance undergo a detection and/or identification operation at 910. By way of example, the second device may be identified as a portable emergency light also including a rechargeable battery by way of a signal communicated over the devices respective communication interfaces.

The appliances are prioritized at 912, for example by applying a set of priority rules applicable to various devices in a case where the power supply has insufficient capability to concurrently power both devices. In the present situation, the priority rules may provide that the emergency light takes precedence over the music player.

At 914, the appliances are operated according to the determined priority. In a first example, the power supply may cause a first operating mode or priority signal to be communicated to the emergency light via the devices' respective communication interface so as to cause a charger of the emergency light to charge (or continue charging) the emergency light battery. According to the first example, supply may cause a second operating mode or priority signal to be communicated to the music player so as to cause a charger of the emergency light to defer charging of the music player battery. In another example, power supply alters a charging energy applied to the devices, for example by limiting a charging voltage or current applied to the lower priority device.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A power supply comprising:
   a power converter that receives electrical power from an input power source and supplies electrical power to an electrical appliance;
   a communication interface configured for communication with the electrical appliance and a component of the power supply;
   the power converter supplies power used to charge a rechargeable power source of the appliance and the power supply includes a power converter disconnect that disconnects at least a portion of the power converter from the input power source as a function of a signal received from the appliance via the communication interface; and
   wherein the signal indicates that the rechargeable power source is substantially fully charged and disconnecting the at least a portion of the power converter from the input power source reduces a power dissipated by the power converter during a time in which the rechargeable power source is not being charged.

2. A power supply comprising:
   a power converter that receives electrical power from an input power source and supplies electrical power to an electrical appliance;
   a communication interface configured for communication with the electrical appliance and a component of the power supply;
   the power converter supplies power used to charge a rechargeable power source of the appliance and the power supply includes a power converter disconnect that disconnects at least a portion of the power converter from the input power source as a function of a signal received from the appliance via the communication interface; and wherein the power converter includes a switched mode power converter including a chopper and the power converter disconnect disables an operation of the chopper in response to the signal.

3. The power supply of claim 1 wherein the power supply includes a power plug and a housing, the power converter and the communication interface are disposed in the housing, and the power plug protrudes from a surface of the housing so as to removably engage a power outlet of the power source.

4. A power supply comprising:
a power converter that receives electrical power from an input power source and supplies electrical power to an electrical appliance;
a communication interface configured for communication with the electrical appliance and a component of the power supply; and
the input power source is an electrical power system that is subject to a time varying power demand and the power supply includes a load shifter that temporally shifts an electrical load presented by the appliance from a time of relatively higher demand to a time of relatively lower demand.

5. The power supply of claim 4 wherein the load shifter selects an appliance mode from at least a first relatively high power operating mode and a second relatively low power mode, and information indicative of the selected mode is provided to the appliance via the communication interface.

6. The power supply of claim 4 wherein the power supply is a wall plug adapter.

7. A power supply comprising:
a power converter that receives electrical power from an input power source and supplies electrical power to an electrical appliance;
a communication interface configured for communication with the electrical appliance and a component of the power supply; and
the input power source is characterized by a time varying power output capability, the power converter is characterized by a time varying power output capability that varies as a function of the input power source power output capability, the power supply includes a power output capability determiner that generates a time varying output indicative of the power output capability of the power converter, and wherein information indicative of the determined capability is communicated to the appliance from time to time via the communication interface.

8. The power supply of claim 7 wherein the appliance includes a battery receiving region that receives at least one of a AAA, AA, C, or D-size secondary battery and a charger that charges a battery received in the battery receiving region, and wherein the information includes information indicative of a desired charging rate.

9. The power supply of claim 7 wherein the appliance includes a first electrical connector, a rechargeable power source, and an appliance electrical circuit, the power supply includes a second electrical connector that removably connects with the first connector, power from the power converter is used to charge the rechargeable power source during a time in which the first and second connectors are connected, and the rechargeable power source powers the appliance electrical circuit during a time in which the first and second connectors are disconnected.

10. A power supply comprising:
a power converter that receives electrical power from an input power source and supplies electrical power to an electrical appliance;
a communication interface configured for communication with the electrical appliance and a component of the power supply; and
the power supply includes first and second connectors that concurrently connect to corresponding connectors of first and second appliances, the power supply includes a load prioritizer that prioritizes electrical loads presented by the first and second appliances, and information indicative of the priority is provided to the first appliance via the communication interface.

11. The power supply of claim 10 wherein the load prioritizer uses information received from the first appliance via the communication interface to prioritize the loads presented by the first and second appliances.

12. The power supply of claim 10 wherein the first appliance includes a charger that charges a rechargeable power source and the information includes information indicative of a desired charging rate.

13. An apparatus comprising:
a power converter that uses electrical power from an AC power line to supply electrical power for charging a secondary battery;
a power converter disconnect that disconnects at least a portion of the power converter from the AC power line as a function of the state of charge of the secondary battery so as to reduce a power dissipated by the power converter during a time in which the secondary battery is not being charged.

14. The apparatus of claim 13 wherein the secondary battery is a secondary battery of a human portable electrical appliance, the power supply includes a state of charge determiner that determines a state of charge of the secondary battery, and the power supply includes an electrical connector that provides a removable electrical connection between the power supply and the electrical appliance.

15. The apparatus of claim 13 wherein the power converter disconnect disconnects the at least a portion of the power converter from the AC power line when the secondary battery is substantially fully charged and reconnects the at least a portion of the power converter to the AC power line to maintain the secondary battery state of charge.

16. The apparatus of claim 13 wherein the power converter includes a transformer and the power converter disconnect disconnects a primary winding of the transformer from the AC power line so as to reduce a power dissipated by the transformer.

17. The apparatus of claim 13 including a charger and a battery receiving region, wherein the charger charges a secondary battery received in the battery receiving region and the secondary battery is inserted in the battery receiving region for charging and removed from the battery receiving region for use.

18. An electrical appliance comprising:
a charger that uses power from a power supply to charge a rechargeable power source;
at least one of a power converter disconnect requester and a temporal load shifter.

19. The appliance of claim 18 wherein the electrical appliance includes a communication interface, a state of charge determiner that determines a state of charge of the rechargeable power source, a power converter disconnect requester that produces a power converter disconnect request as a function of the determined state of charge, and the disconnect request is communicated to the power supply via the communication interface.

20. The appliance of claim 19 wherein the power supply includes a first electrical connector, the appliance includes the rechargeable power source, a charger, an appliance electrical circuit, and a second electrical connector, wherein the charger uses power from the power supply to charge the rechargeable power source during a time when the first and second connectors are connected and the appliance electrical circuit operates using power from the power source during a time when the first and second connectors are not connected.

21. The appliance of claim 19 wherein the power supply includes a power converter and the rechargeable power source supplies power to the power supply when the power converter is disconnected from the input power source.

22. The appliance of claim 18 wherein the power supply receives power from a power source that is subject to a time varying power demand, the appliance includes appliance electrical circuitry, an appliance power source, and a load shifter, and wherein the appliance is removably connectable to the power supply for power communication therewith, the load shifter temporally shifts an electrical load presented by the appliance to the power supply during a time when the appliance is connected to the power supply, and wherein the appliance electrical circuitry operates using power from the appliance power source during a time when the appliance is disconnected from the power supply.

23. The appliance of claim 18 wherein the power supply receives power from a power source that is subject is to a time varying power demand, the appliance includes a charger and a load shifter, the charger uses power from the power supply to charge a rechargeable power source, and the load shifter shifts an electrical load presented by the charger from a time of relatively high power demand from a time of relatively low demand.

24. The appliance of claim 18 wherein the appliance includes a measurement device, a GPS device, or a media player.

25. The appliance of claim 18 including a power converter disconnect requester and a temporal load shifter.

26. An apparatus comprising:
a first apparatus portion comprising;
a first housing
a power converter housed by the first housing;
a first electrical connector;
a second, human portable apparatus portion comprising:
a second housing;
a rechargeable power source receiving region;
a charger that uses power from the power converter to charge a rechargeable power source received in the receiving region, wherein the receiving region and the charger are housed by the second housing;
a second electrical connector that provides a removable electrical connection with the first electrical connector;
at least one of a power converter disconnect that disconnects the power converter from an input power source as a function of the state of charge of the rechargeable power source, a load shifter that temporally shifts an electrical load presented by charger, a power supply capability determiner that determines a power capability of the first appliance portion, and a load prioritizer that prioritizes an electrical load presented by the charger.

27. The apparatus of claim 26 wherein the first apparatus portion is configured as a wall plug adapter.

28. The apparatus of claim 26 including a power converter disconnect housed by the first housing.

29. The apparatus of claim 26 including a load shifter.

30. The apparatus of claim 26 wherein the first apparatus portion includes a third electrical connector and a load prioritizer, wherein the third electrical connector provides a removable electrical connection with an electrical connector of a third, human portable electrical appliance and the load prioritizer prioritizes the electrical loads presented by the second apparatus portion and the third electrical appliance.

31. The apparatus of claim 26 wherein the second apparatus portion is a consumer electrical appliance.

32. The apparatus of claim 26 wherein only one of the first apparatus portion or the second apparatus portion includes a communication interface configured to communicate with the other of the first apparatus portion or second apparatus portion.

33. A method of using a power supply including a power converter and a communication interface, the method comprising:
using the power converter to supply electrical power to a first electrical appliance;
receiving a first signal from the first electrical appliance via the communication interface;
detecting a disconnection of the electrical appliance from the power supply; and
in response to the detected disconnection, and without unplugging the power supply, disconnecting an input of the power converter from the power system.

34. A method of using a power supply including a power converter and a communication interface, the method comprising:
using the power converter to supply electrical power to a first electrical appliance;
receiving a first signal from the first electrical appliance via the communication interface,
using power from the power converter to charge a rechargeable power source of the appliance so that the rechargeable power source is substantially fully charged;
disconnecting at least a portion of the power converter from an input power source;
reconnecting the at least a portion of power converter to the power source, using power from the reconnected power converter to charge the rechargeable power source, and disconnecting the at least a portion of the power source from the input power source a plurality of times so as to maintain a state of charge of the rechargeable power source.

35. A method of using a power supply including a power converter and a communication interface, the method comprising:
using the power converter to supply electrical power to a first electrical appliance, wherein the power converter receives power from an electrical power source that is subject to time varying demand;
receiving a first signal from the first electrical appliance via the communication interface,
determining a desired load shift;
communicating information indicative of the desired load shift via the communication interface; and
time shifting an electrical load presented by the electrical appliance.

36. A method of using a power supply including a power converter and a communication interface, the method comprising:
using the power converter to supply electrical power to a first electrical appliance;

receiving a first signal from the first electrical appliance via the communication interface;

wherein the power converter receives power from a solar power source having a time varying power output capability and the power converter output capability varies as a function of the time varying power output capability of the solar power source;

communicating information indicative of the power converter output capability via the communication interface;

varying, as a function of the communicated information, a rate of charge of a rechargeable power source of the appliance;

repeating the steps of varying and communicating;

disconnecting the appliance from the power supply;

carrying the appliance to a location remote from the power supply; and using power from the rechargeable power source to operate the appliance.

37. A method of using a power supply including apower converter and a communication interface, wherein the power supply is a wall plug adapter, the method comprising:

using the power converter to supply electrical power to a first electrical appliance;

receiving a first signal from the first electrical appliance via the communication interface receiving a second signal from a second electrical appliance, wherein the first and second electrical appliances are concurrently electrically connected to the power supply;

using the first signal to identify the first appliance; and prioritizing the electrical loads presented by the first and second appliances.

38. The method of claim 37 comprising:

selecting a mode from at least a first relatively high power operating mode and a second relatively low power mode;

sending information indicative of the selected mode to the first appliance via the communication interface.

\* \* \* \* \*